United States Patent
Liu et al.

(10) Patent No.: US 11,292,098 B2
(45) Date of Patent: Apr. 5, 2022

(54) HUB CHUCK, HUB FIXTURE AND X-RAY DETECTING APPARATUS

(71) Applicant: CITIC Dicastal CO., LTD., Hebei (CN)

(72) Inventors: Xinghua Liu, Qinhuangdao (CN); Zhiliang Zhang, Qinhuangdao (CN); Zhiqiang Lu, Qinhuangdao (CN); Rui Liu, Qinhuangdao (CN); Di Cao, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 145 days.

(21) Appl. No.: 16/812,551

(22) Filed: Mar. 9, 2020

(65) Prior Publication Data

US 2021/0031320 A1 Feb. 4, 2021

(30) Foreign Application Priority Data

Jul. 30, 2019 (CN) .......................... 201910687874.1

(51) Int. Cl.
*B23Q 3/18* (2006.01)
*B60C 25/05* (2006.01)

(52) U.S. Cl.
CPC .......... *B23Q 3/186* (2013.01); *B60C 25/0545* (2013.01)

(58) Field of Classification Search
CPC ......... B23Q 3/186; B23B 31/00; B23B 31/02; B23B 31/10; B23B 31/1072; B23B 31/117; B23B 2215/08; B23B 2231/2045; B60C 25/0545; B60C 25/0539; Y10T 279/17752; Y10T 279/13
See application file for complete search history.

(56) References Cited

U.S. PATENT DOCUMENTS

2007/0273108 A1* 11/2007 Kitatsuru .............. B23B 31/185
279/106
2015/0273588 A1* 10/2015 Bowen ...................... B23B 5/28
82/104

* cited by examiner

*Primary Examiner* — Tyrone V Hall, Jr.
(74) *Attorney, Agent, or Firm* — Cooper Legal Group, LLC

(57) ABSTRACT

A hub chuck, includes a clamping center shaft, a top cover plate, a middle step gear and a tapered bottom plate. In a three-layer structure of the cover plate, the step gear and the tapered bottom plate of the chuck, the maximum outer ring diameter of the cover plate is smaller than that of the step gear, the minimum outer ring diameter of the step gear is smaller than that of the tapered bottom plate, the lower part of the step gear and the upper surface of the tapered bottom plate form a ring groove, a lower rim of a hub can be caught in the ring groove, and tapered teeth at the upper part of the step gear can be pressed to an inner wheel lip.

10 Claims, 6 Drawing Sheets

HUB CHUCK, HUB FIXTURE AND X-RAY DETECTING APPARATUS

CROSS-REFERENCE TO RELATED APPLICATIONS

The present application claims benefit of Chinese Patent Application No. 201910687874.1, filed on Jul. 30, 2019, the contents of which are hereby incorporated by reference in their entirety.

BACKGROUND

In the field of automobile hub production, a pattern of mixed-line production of casting, spinning and forging hubs is involved. In the process of detecting internal defects by an X-ray machine, a hub blank is clamped by a fixture of the X-ray machine to rotate. However, the lower rim of the blank after spun by a spinning machine may have uneven burrs. When the blank is clamped by the fixture of the existing X-ray machine to rotate, the hub deflects due to excessive runout, resulting in inaccurate positioning of the X-ray detection process, failure of the detection result, and easy-to-damage of devices. The hub blank may be thrown out of a clamping station due to excessive vibration, which poses a great risk to the detection.

SUMMARY

The present disclosure relates to the technical field of hub fixtures, particularly to a hub fixture on an X-ray machine, and specifically to a hub chuck, a hub fixture and an X-ray detecting apparatus.

Embodiments of the present disclosure provide a hub chuck, a hub fixture and an X-ray detecting apparatus, where irregular burrs of a lower rim of a hub can be avoided, so that clamping points are changed from the burrs to the upper part of an inner wheel lip, the defect of deflection caused by excessive runout when the fixture holds the hub is overcome, the detection result is accurate, the risk of device damage is reduced, the work efficiency is improved, and the labor burden of workers is reduced.

In order to achieve the above objectives, the present disclosure provides the following technical solution:

In a first aspect, a hub chuck is provided, including a clamping center shaft, a top cover plate, a middle step gear and a tapered bottom plate, in which a first central hole is formed in the center of the cover plate, and first positioning holes are formed in the circumference of the cover plate; a second central hole is formed in the center of the step gear, and second positioning holes are formed in the circumference of the step gear; a third central hole is formed in the center of the tapered bottom plate, and third positioning holes are formed in the circumference of the tapered bottom plate; the first central hole, the second central hole, and the third central hole correspond to each other; the first positioning holes, the second positioning holes, and the third positioning holes correspond to each other; the cover plate, the step gear and the tapered bottom plate are fixedly mounted on the clamping center shaft layer by layer, the clamping center shaft is fixedly connected to the cover plate, the step gear and the tapered bottom plate through the first central hole, the second central hole and the third central hole, and the clamping center shaft can drive the cover plate, the step gear and the tapered bottom plate to rotate; the step gear has a large diameter at the upper part and a small diameter at the lower part, and a ring of tapered teeth is disposed at the upper part of the step gear; the tapered bottom plate has a small diameter at the upper part and a large diameter at the lower part, and the outer ring of the tapered bottom plate is a tapered surface; the maximum outer ring diameter of the cover plate is smaller than that of the step gear, the minimum outer ring diameter of the step gear is smaller than that of the tapered bottom plate, and the lower part of the step gear and the upper surface of the tapered bottom plate form a ring groove; a lower rim of a hub can be caught in the ring groove, and the tapered teeth at the upper part of the step gear can be pressed to the upper part of an inner wheel lip.

In some embodiments, the tapered surface may be disposed as tapered teeth. With the design of tapered teeth of the tapered surface in this embodiment, the hub is scooped up more easily and clamped more firmly.

In some embodiments, a key groove is formed in the second central hole and the third central hole respectively, a corresponding key groove is formed in the clamping center shaft, and a key is provided to cooperate with the key grooves in the second central hole and the third central hole and the key groove of the clamping center shaft so as to prevent random rotation of the clamping center shaft.

In some embodiments, the cover plate is fixedly mounted to the upper end of the clamping center shaft through a screw passing through the first central hole.

In some embodiments, positioning pins or positioning screws are inserted into the first positioning holes, the second positioning holes and the third positioning holes, such that the cover plate, the step gear and the tapered bottom plate do not rotate relative to each other.

In some embodiments, the cover plate has a large diameter at the upper part and a small diameter at the lower part, the upper end face of the cover plate is horizontal, and the diameter of the upper end face is smaller than the maximum outer ring diameter of the step gear. In this embodiment, the diameter of the upper end face of the cover plate is smaller than the maximum outer ring diameter of the step gear, which prevents the cover plate from interfering with the wall of the outer rim.

In some embodiments, the cover plate is provided with weight reduction grooves, and the step gear and the tapered bottom plate are both provided with weight reduction grooves. For example, in some embodiments, the cover plate is made of aluminum alloy and provided with weight reduction grooves, and the step gear and the tapered bottom plate are made of carbon steel, quenched on surfaces, and provided with weight reduction grooves respectively, thereby achieving high strength, high wear resistance and light weight.

In a second aspect, an embodiment of the present disclosure provides a hub fixture, including a fixture holder, where four hub chucks as described in any of the above embodiments are disposed on the fixture holder, the fixture holder can drive the hub chucks to clamp a hub, a lower rim of the hub is caught in the ring grooves, and the tapered teeth at the upper parts of the step gears are clamped to the upper part of the inner wheel lip.

In some embodiments, the clamping center shafts are connected to a rotation driving assembly, the rotation driving assembly can drive the clamping center shafts to rotate, the clamping center shafts rotate to drive the hub chucks to rotate, and the hub chucks drive the hub to rotate through the step gears.

In a third aspect, an embodiment of the present disclosure provides an X-ray detecting apparatus, including the hub fixture according to any of the above embodiments, the hub fixture holder being mounted in the X-ray detecting apparatus.

Compared with the prior art, the present disclosure has the following beneficial effects: the present disclosure provides a hub chuck, a hub fixture and an X-ray detecting apparatus, where in a three-layer structure of a cover plate, a step gear and a tapered bottom plate, the maximum outer ring diameter of the cover plate is smaller than that of the step gear, the minimum outer ring diameter of the step gear is smaller than that of the tapered bottom plate, the lower part of the step gear and the upper surface of the tapered bottom plate form a ring groove, a lower rim of a hub can be caught in the ring groove, and tapered teeth at the upper part of the step gear can be pressed to an inner wheel lip to avoid irregular burrs of the lower rim of the hub, so that clamping points are changed from the burrs to the upper part of the inner wheel lip, the defect of deflection caused by excessive runout when the fixture holds the hub is overcome, the detection result is accurate, the risk of device damage is reduced, the work efficiency is improved, and the labor burden of workers is reduced.

BRIEF DESCRIPTION OF THE DRAWINGS

In order to more clearly explain the technical solution in the embodiments of the disclosure, drawings which require to be used in description of the embodiments are simply introduced below, obviously, the drawings in description below are some embodiments of the disclosure, and those having ordinary skill in the art can further acquire other drawings without creative efforts according to those drawings.

Figure 1:
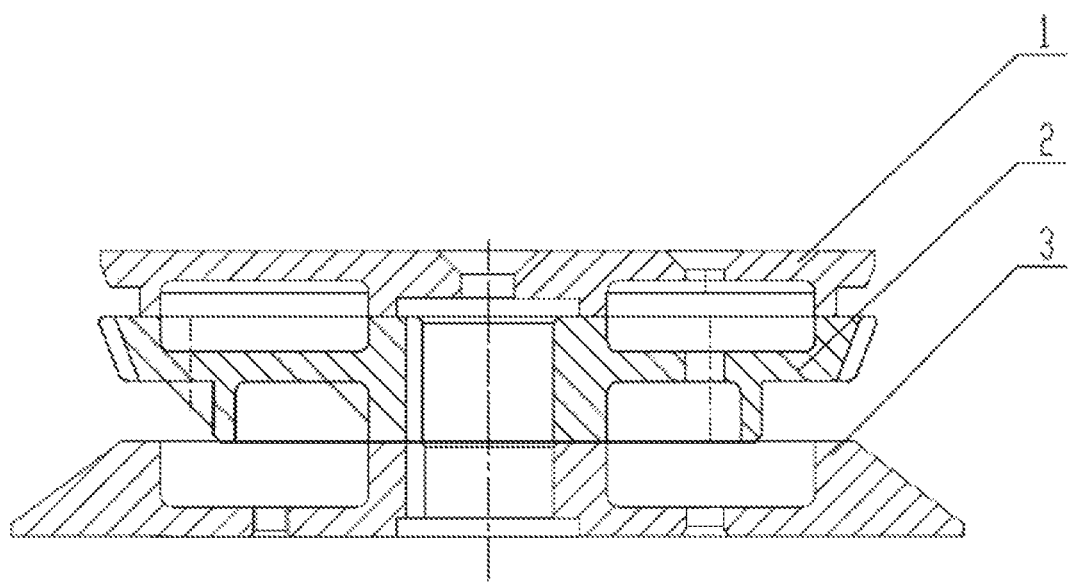
FIG. 1 is a schematic diagram of an assembly structure of a cover plate, a step gear and a tapered bottom plate of a hub chuck according to the present disclosure.
Figure 2:
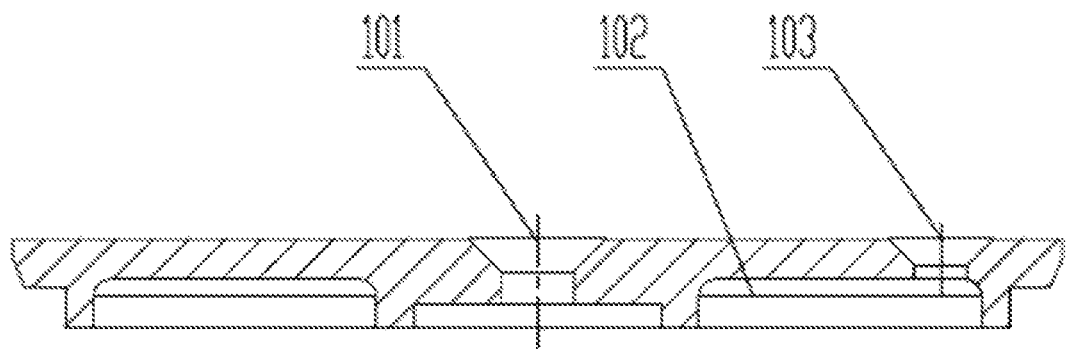
FIG. 2 is a schematic structural diagram of the cover plate of the hub chuck according to the present disclosure.
Figure 3:
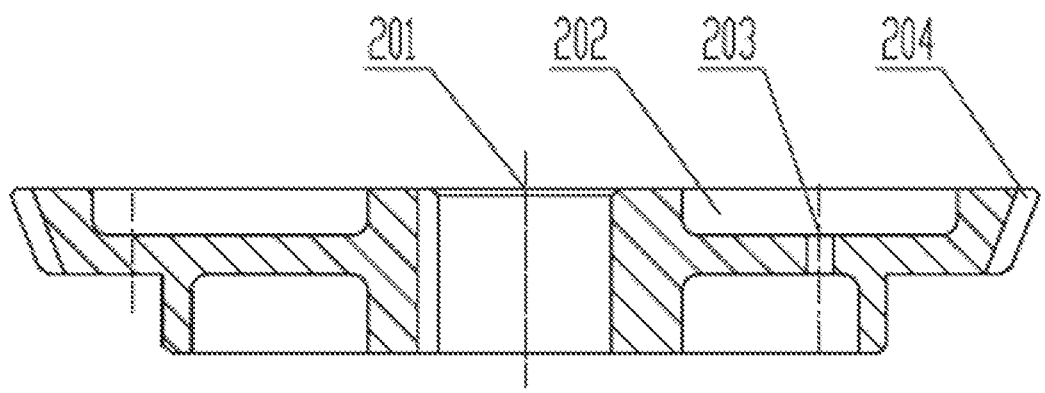
FIG. 3 is a schematic structural diagram of the step gear of the hub chuck according to the present disclosure.
Figure 4:
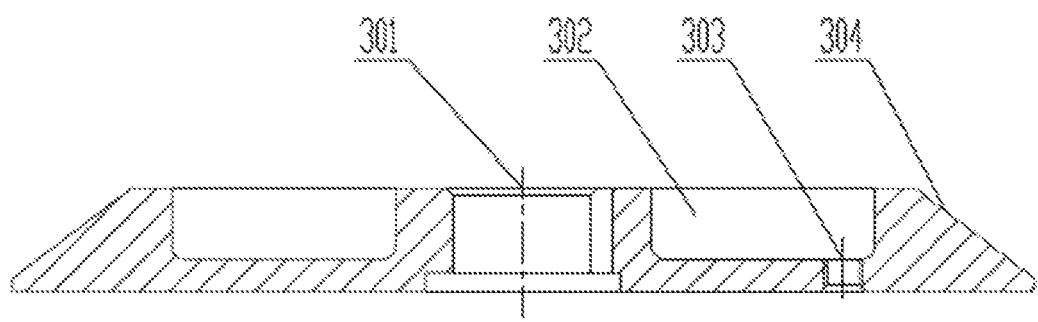
FIG. 4 is a schematic structural diagram of the tapered bottom plate of the hub chuck according to the present disclosure.

The reference numerals used in the description are listed as follows:

1—cover plate, 2—step gear, 3—tapered bottom plate, 101—first central hole, 102—first weight reduction groove, 103—first positioning hole, 201—second central hole, 202—second weight reduction groove, 203—second positioning hole, 204—tapered tooth, 301—third central hole, 302—third weight reduction groove, 303—third positioning hole, 304—tapered surface, 4—hub, 5—hub chuck, 6—fixture holder, 7—hub lower rim, 8—clamping center shaft.

DETAILED DESCRIPTION OF THE EMBODIMENTS

The technical solution in the embodiments of the disclosure is clearly and completely described in combination with drawings of the embodiments of the disclosure below, and obviously, the described embodiments are part of embodiments of the disclosure rather than all embodiments. Based on the embodiments of the disclosure, all the other embodiments obtained by those having ordinary skill in the art without any creative works are within the protection scope of the disclosure.

The terms 'first', 'second', 'third', 'fourth' and the like in the specification and in the claims of the disclosure are used for distinguishing different objects but not for describing a specific sequence. Furthermore, the terms 'include', 'including', and 'have' as well as their any variations are intended to cover a non-exclusive inclusion. For example, a process, method, system, product or equipment including a series of steps or units does not limit steps or units which have been listed, but selectively further includes steps or units which are not listed, or selectively further includes other inherent steps or units for the process, method, product or equipment.

Reference in the specification to 'embodiments' of the disclosure means that a particular feature, structure or characteristic described in connection with the embodiments is included in at least one embodiment of the disclosure. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the disclosure can be combined to other embodiments.

In order to further understand the content, features and functions of the disclosure, the following embodiments are given and illustrated with the attached drawings as follows.

First Embodiment

Referring to FIGS. 1-4, the first embodiment discloses a hub chuck, including a clamping center shaft 8, a top cover plate 1, a middle step gear 2 and a tapered bottom plate 3, in which a first central hole 101 is formed in the center of the cover plate 1, and first positioning holes 103 are formed in the circumference of the cover plate 1; the step gear 2 and the tapered bottom plate 3 are respectively provided with a second central hole 201 and a third central hole 301, second positioning holes 203 and third positioning holes 303 corresponding to the first central hole 101 and the first positioning holes 103 of the cover plate 1. The second central hole 201 is formed in the center of the step gear 2, and the second positioning holes 203 are formed in the circumference of the step gear 2; the third central hole 301 is formed in the center of the tapered bottom plate 3, and the third positioning holes 303 are formed in the circumference of the tapered bottom plate 3; the first central hole 101, the second central hole 201, and the third central hole 301 correspond to each other; and the first positioning holes 103, the second positioning holes 203, and the third positioning holes 303 correspond to each other. The third positioning holes 303 of the tapered bottom plate 3 are threaded holes; positioning pins or positioning screws are inserted into the first positioning holes 103, the second positioning holes 203 and the third positioning holes 303, such that the cover plate 1, the step gear 2 and the tapered bottom plate 3 do not rotate relative to each other.

The cover plate 1, the step gear 2 and the tapered bottom plate 3 are fixedly mounted on the clamping center shaft 8 layer by layer, the clamping center shaft 8 is fixedly connected to the cover plate 1, the step gear 2 and the tapered bottom plate 3 through the first central hole 101, the second central hole 201 and the third central hole 301, and the clamping center shaft 8 can drive the cover plate 1, the step gear 2 and the tapered bottom plate 3 to rotate. The cover plate 1 is fixedly mounted to the upper end of the clamping center shaft 8 through a screw passing through the first central hole 101. A key groove is formed in the second central hole 201 and the third central hole 301 respectively, a corresponding key groove is formed in the clamping center shaft 8, and a key is provided to cooperate with the key grooves in the second central hole 201 and the third central hole 301 and the key groove of the clamping center shaft 8 so as to prevent random rotation of the clamping center shaft 8.

The cover plate 1 is made of aluminum alloy and provided with first weight reduction grooves 102, and the step gear 2 and the tapered bottom plate 3 are made of carbon steel, quenched on surfaces, and provided with second weight reduction grooves 202 and third weight reduction grooves 302 respectively, thereby achieving high strength, high wear resistance and light weight.

The cover plate 1 has a large diameter at the upper part and a small diameter at the lower part, the upper end face of the cover plate 1 is horizontal, and the diameter of the upper end face is smaller than the maximum outer ring diameter of the step gear 2. The step gear 2 has a large diameter at the upper part and a small diameter at the lower part, and a ring of tapered teeth is disposed at the upper part of the step gear 2, so that a hub 4 is scooped up more easily and clamped more firmly; the tapered bottom plate 3 has a small diameter at the upper part and a large diameter at the lower part, the outer ring of the tapered bottom plate 3 is a tapered surface 304, and the tapered surface 304 may be disposed as tapered teeth 204; the maximum outer ring diameter of the cover plate 1 is smaller than that of the step gear 2, the minimum outer ring diameter of the step gear 2 is smaller than that of the tapered bottom plate 3, the diameter of the lower part of the step gear 2 is reduced to be smaller than the minimum outer ring diameter of the upper part of the tapered bottom plate 3, and the lower part of the step gear 2 and the upper surface of the tapered bottom plate 3 form a ring groove; a lower rim of the hub 4 can be caught in the ring groove, and the tapered teeth at the upper part of the step gear 2 can be pressed to the upper part of an inner wheel lip to avoid irregular burrs of the lower rim 7 of the hub, so that clamping points are changed from the burrs to the upper part of the inner wheel lip.

Second Embodiment

Figure 5:
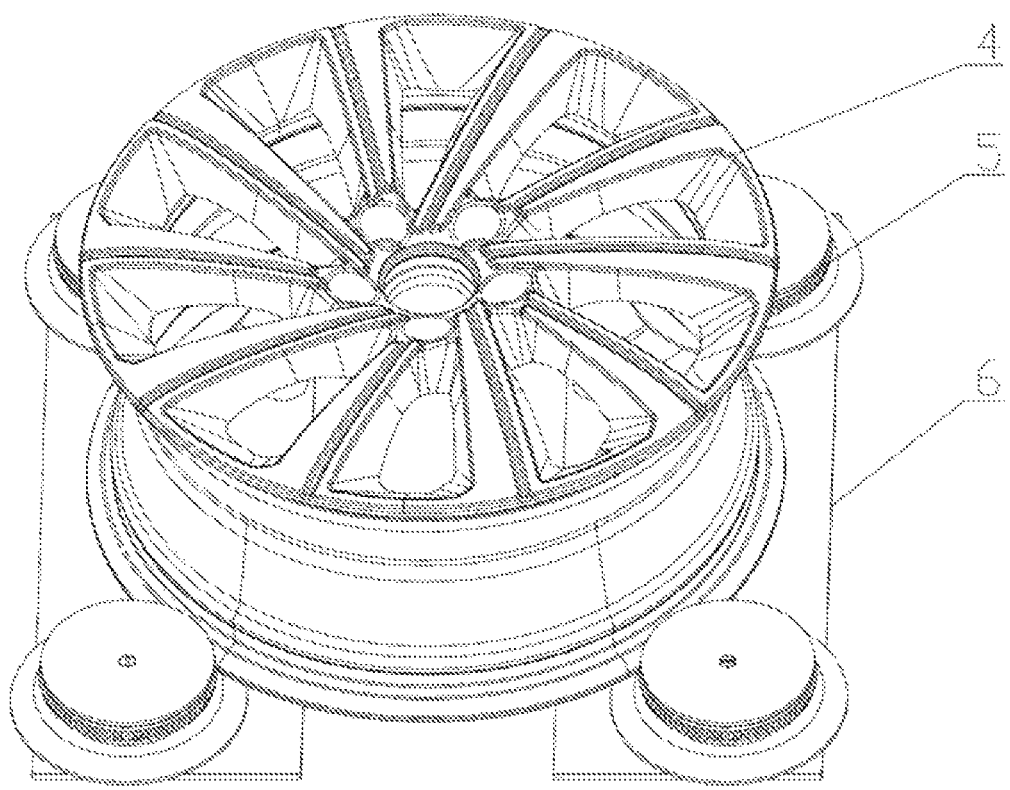
FIG. 5 is a schematic structural diagram of a hub fixture according to the present disclosure.
Figure 6:
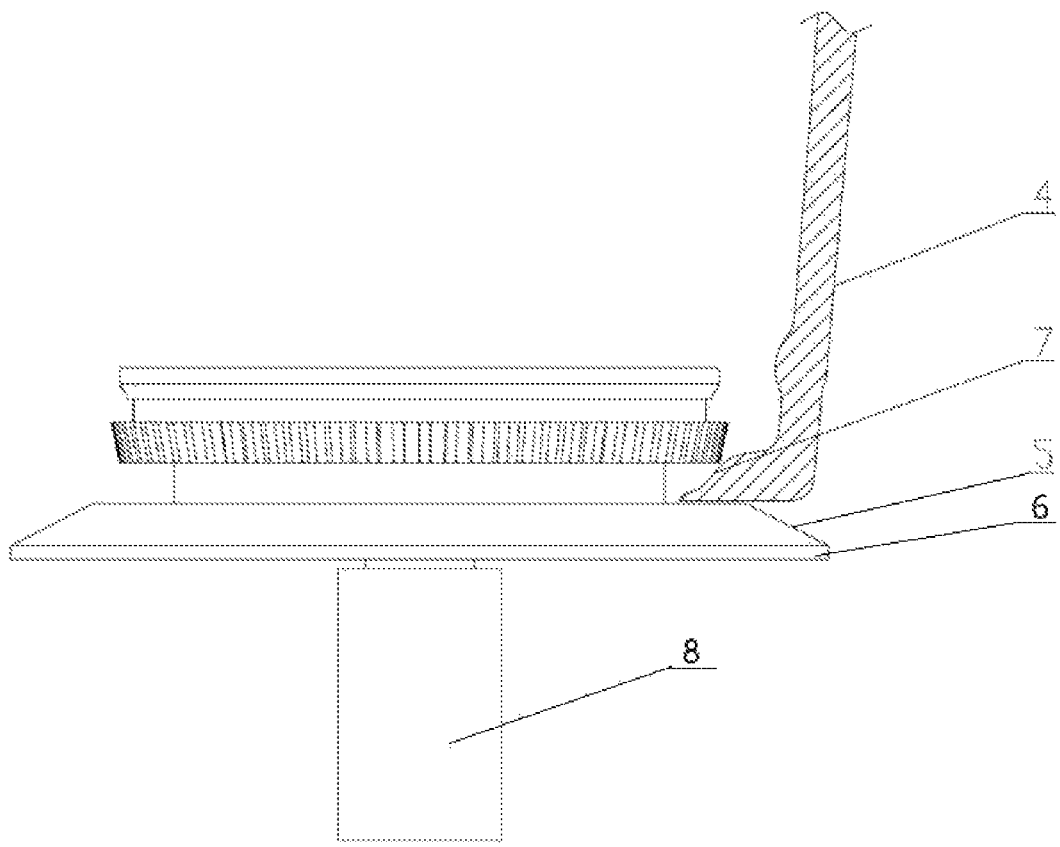
FIG. 6 is a schematic diagram of a partial structure of the hub fixture according to the present disclosure.

As shown in FIGS. 5-6, this embodiment discloses a hub fixture, including a fixture holder 6, where four hub chucks 5 as described in any of the above embodiments are disposed on the fixture holder 6, the four hub chucks 5 and the fixture holder 6 constitute a main body of the fixture, the fixture holder 6 may be mounted on an X-ray machine, the fixture holder 6 can drive the hub chucks 5 to clamp the hub 4, the lower rim of the hub 4 is caught in the ring grooves, and the tapered teeth at the upper parts of the step gears 2 are clamped to the upper part of the inner wheel lip; the clamping center shafts 8 are connected to a rotation driving assembly, the rotation driving assembly can drive the clamping center shafts 8 to rotate, the clamping center shafts 8 rotate to drive the hub chucks 5 to rotate, and the hub chucks 5 drive the hub 4 to rotate through the step gears 2. The hub fixture can avoid irregular burrs of the lower rim 7 of the hub, so that clamping points are changed from the burrs to the upper part of the inner wheel lip, the defect of deflection caused by excessive runout when the fixture holds the hub is overcome, the risk of device damage is reduced, the work efficiency is improved, and the labor burden of workers is reduced.

Third Embodiment

This embodiment discloses an X-ray detecting apparatus, including the hub fixture according to any of the above embodiments, or the hub chuck 5 according to any of the above embodiments, the hub fixture holder 6 being mounted in the X-ray detecting apparatus. In the three-layer structure of the cover plate 1, the step gear 2 and the tapered bottom plate 3 of the chuck, the maximum outer ring diameter of the cover plate 1 is smaller than that of the step gear 2, the minimum outer ring diameter of the step gear 2 is smaller than that of the tapered bottom plate 3, the lower part of the step gear 2 and the upper surface of the tapered bottom plate 3 form a ring groove, the lower rim of the hub 4 can be caught in the ring groove, and the tapered teeth at the upper part of the step gear 2 can be pressed to the inner wheel lip to avoid irregular burrs of the lower rim 7 of the hub, so that clamping points are changed from the burrs to the upper part of the inner wheel lip, the defect of deflection caused by excessive runout when the fixture holds the hub is overcome, the detection result is accurate, the risk of device damage is reduced, the work efficiency is improved, and the labor burden of workers is reduced.

The embodiments of the disclosure are described in detail above, particular examples are used herein to explain the principle and embodiments of the disclosure, and the above description of the embodiments is only used to help understanding the methods and core concept of the disclosure; and meanwhile, for those having ordinary skill in the art, according to the idea of the disclosure, there will be changes in the specific implementation mode and disclosure scope, in conclusion, the contents of the specification shall not be construed as a limitation of the disclosure.

The invention claimed is:

1. A hub chuck, comprising a clamping center shaft, a top cover plate, a middle step gear and a tapered bottom plate, wherein a first central hole is formed in the center of the cover plate, and first positioning holes are formed in the circumference of the cover plate; a second central hole is formed in the center of the step gear, and second positioning holes are formed in the circumference of the step gear; a third central hole is formed in the center of the tapered bottom plate, and third positioning holes are formed in the circumference of the tapered bottom plate; the first central hole, the second central hole, and the third central hole correspond to each other; the first positioning holes, the second positioning holes, and the third positioning holes correspond to each other;

the cover plate, the step gear and the tapered bottom plate are fixedly mounted on the clamping center shaft layer by layer, the clamping center shaft is fixedly connected to the cover plate, the step gear and the tapered bottom plate through the first central hole, the second central hole and the third central hole, respectively, and the clamping center shaft is able to drive the cover plate, the step gear and the tapered bottom plate to rotate;

the step gear has a large diameter at an upper part of the step gear and a small diameter at a lower part of the step gear, and a ring of tapered teeth is disposed at the upper part of the step gear; the tapered bottom plate has a small diameter at an upper part of the tapered bottom plate and a large diameter at a lower part of the tapered bottom plate, and an outer ring of the tapered bottom plate is a tapered surface; the maximum diameter of the cover plate is smaller than that of the step gear, the minimum diameter of the step gear is smaller than that of the tapered bottom plate, and the lower part of the step gear and an upper surface of the tapered bottom plate form a ring groove; a lower rim of a hub is able to be caught in the ring groove, and the tapered teeth at the upper part of the step gear is able to be pressed to an upper part of an inner wheel lip.

2. The hub chuck according to claim 1, wherein the tapered surface is disposed as tapered teeth.

3. The hub chuck according to claim 1, wherein a key groove is formed in the second central hole and the third central hole respectively, a corresponding key groove is formed in the clamping center shaft, and a key is provided to cooperate with the key grooves in the second central hole and the third central hole and the key groove of the clamping center shaft so as to prevent random rotation of the clamping center shaft.

4. The hub chuck according to claim 3, wherein the cover plate is fixedly mounted to the upper end of the clamping center shaft through a screw passing through the first central hole.

5. The hub chuck according to claim 1, wherein positioning pins or positioning screws are inserted into the first positioning holes, the second positioning holes and the third positioning holes, such that the cover plate, the step gear and the tapered bottom plate do not rotate relative to each other.

6. The hub chuck according to claim 1, wherein the cover plate has a large diameter at the upper part and a small diameter at the lower part, the upper end face of the cover plate is horizontal, and the diameter of the upper end face is smaller than the maximum outer ring diameter of the step gear.

7. The hub chuck according to claim 1, wherein the cover plate is provided with weight reduction grooves, and the step gear and the tapered bottom plate are both provided with weight reduction grooves.

8. A hub fixture, comprising a fixture holder, wherein four hub chucks are disposed on the fixture holder, each of the hub chuck comprises a clamping center shaft, a top cover plate, a middle step gear and a tapered bottom plate, wherein a first central hole is formed in the center of the cover plate, and first positioning holes are formed in the circumference of the cover plate; a second central hole is formed in the center of the step gear, and second positioning holes are formed in the circumference of the step gear; a third central hole is formed in the center of the tapered bottom plate, and third positioning holes are formed in the circumference of the tapered bottom plate; the first central hole, the second central hole, and the third central hole correspond to each other; the first positioning holes, the second positioning holes, and the third positioning holes correspond to each other;

the cover plate, the step gear and the tapered bottom plate are fixedly mounted on the clamping center shaft layer by layer, the clamping center shaft is fixedly connected to the cover plate, the step gear and the tapered bottom plate through the first central hole, the second central hole and the third central hole, respectively, and the clamping center shaft is able to drive the cover plate, the step gear and the tapered bottom plate to rotate;

the step gear has a large diameter at an upper part of the step gear and a small diameter at a lower part of the step gear, and a ring of tapered teeth is disposed at the upper part of the step gear; the tapered bottom plate has a small diameter at an upper part of the tapered bottom plate and a large diameter at the a lower part of the tapered bottom plate, and the an outer ring of the tapered bottom plate is a tapered surface; the maximum outer ring diameter of the cover plate is smaller than that of the step gear, the minimum outer ring diameter of the step gear is smaller than that of the tapered bottom plate, and the lower part of the step gear and an upper surface of the tapered bottom plate form a ring groove; a lower rim of a hub is able to be caught in the ring groove, and the tapered teeth at the upper part of the step gear is able to be pressed to an upper part of an inner wheel lip, the fixture holder is able to drive the hub chucks to clamp a hub, a lower rim of the hub is caught in the ring grooves, and the tapered teeth at the upper parts of the step gears are clamped to the upper part of the inner wheel lip.

9. The hub fixture according to claim 8, wherein the clamping center shafts are connected to a rotation driving assembly, the rotation driving assembly is able to drive the clamping center shafts to rotate, the clamping center shafts rotate to drive the hub chucks to rotate, and the hub chucks drive the hub to rotate through the step gears.

10. An X-ray detecting apparatus, comprising a hub fixture mounted in the X-ray detecting apparatus, wherein the hub fixture comprises a fixture holder, four hub chucks are disposed on the fixture holder, each of the hub chuck comprises a clamping center shaft, a top cover plate, a middle step gear and a tapered bottom plate, wherein a first central hole is formed in the center of the cover plate, and first positioning holes are formed in the circumference of the cover plate; a second central hole is formed in the center of the step gear, and second positioning holes are formed in the circumference of the step gear; a third central hole is formed in the center of the tapered bottom plate, and third positioning holes are formed in the circumference of the tapered bottom plate; the first central hole, the second central hole, and the third central hole correspond to each other; the first positioning holes, the second positioning holes, and the third positioning holes correspond to each other;

the cover plate, the step gear and the tapered bottom plate are fixedly mounted on the clamping center shaft layer by layer, the clamping center shaft is fixedly connected to the cover plate, the step gear and the tapered bottom plate through the first central hole, the second central hole and the third central hole, respectively, and the clamping center shaft is able to drive the cover plate, the step gear and the tapered bottom plate to rotate;

the step gear has a large diameter at an upper part of the step gear and a small diameter at a lower part of the step gear, and a ring of tapered teeth is disposed at the upper part of the step gear; the tapered bottom plate has a small diameter at an upper part of the tapered bottom plate and a large diameter at a lower part of the tapered bottom plate, and an outer ring of the tapered bottom plate is a tapered surface; the maximum diameter of the cover plate is smaller than that of the step gear, the minimum diameter of the step gear is smaller than that of the tapered bottom plate, and the lower part of the step gear and an upper surface of the tapered bottom plate form a ring groove; a lower rim of a hub is able to be caught in the ring groove, and the tapered teeth at the upper part of the step gear is able to be pressed to an upper part of an inner wheel lip, the fixture holder is able to drive the hub chucks to clamp a hub, a lower rim of the hub is caught in the ring grooves, and the tapered teeth at the upper parts of the step gears are clamped to the upper part of the inner wheel lip.

\* \* \* \* \*